Patented Oct. 25, 1949

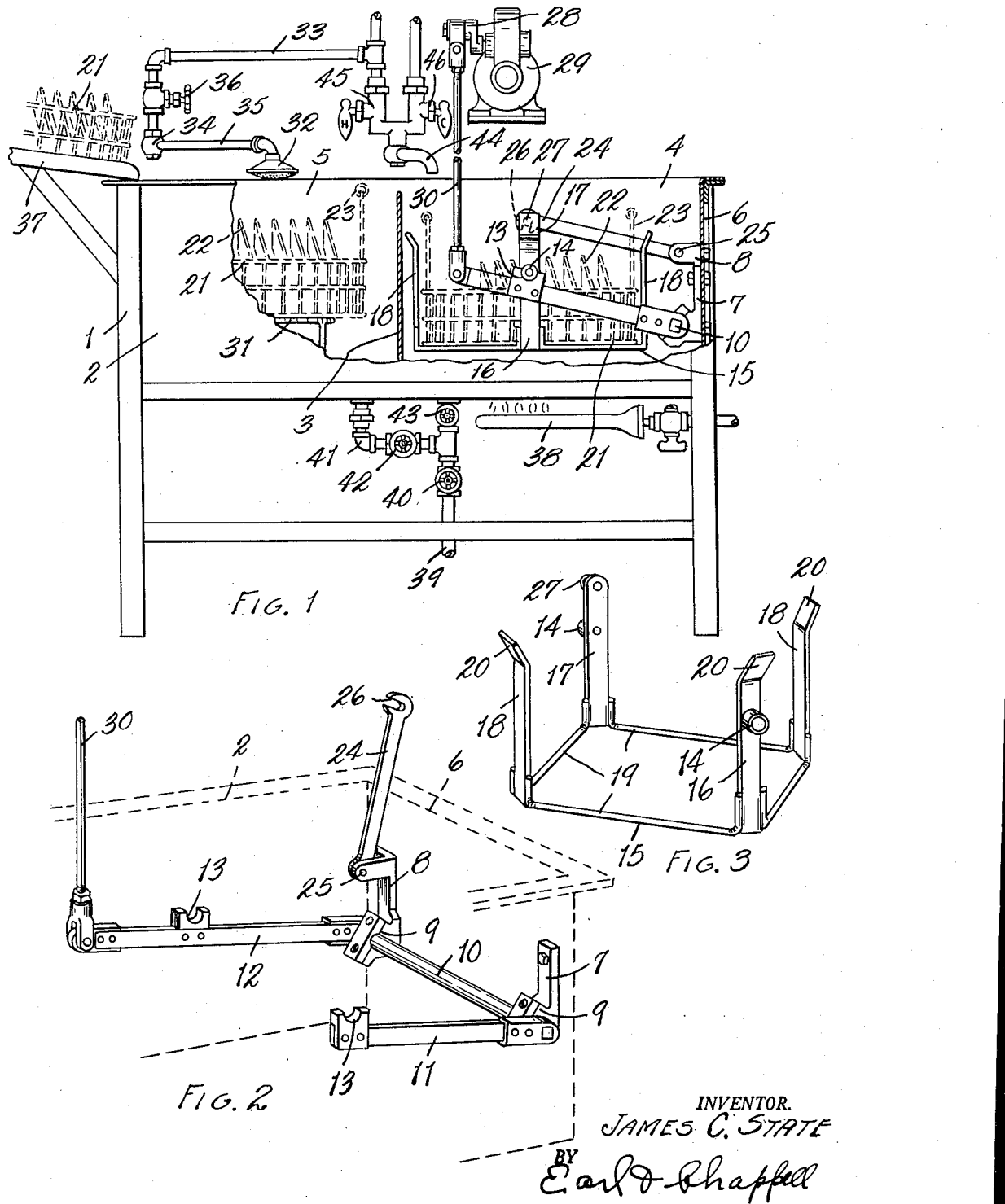

2,485,673

UNITED STATES PATENT OFFICE 2,485,673

DISHWASHING APPARATUS

James C. State, Kalamazoo, Mich.

Application January 27, 1944, Serial No. 519,853

9 Claims. (Cl. 134—160)

This invention relates to improvements in dish washing apparatus.

The main objects of this invention are:

First, to provide a dish washing apparatus which is efficient and of large capacity and at the same time compact and simple and economical in structure.

Second, to provide a dish washing apparatus which is well adapted for use in small restaurants and the like and one in which the washing receptacle or compartment may also be used for the washing of pots and pans.

Objects relating to details and economies of the invention will appear from the description to follow. The invention is defined and pointed out in the claims.

A preferred embodiment of the invention is illustrated in the accompanying drawing, in which:

Fig. 1 is a fragmentary front elevation of a dish washing apparatus embodying the features of my invention, the dish basket with dishes therein being indicated by dotted lines, certain of the parts being conventionally illustrated for convenience and simplicity of illustration.

Fig. 2 is a fragmentary perspective view with the basket cradle removed, the receptacle being indicated by dotted lines.

Fig. 3 is a perspective view of the basket cradle.

The embodiment of my invention illustrated in the accompanying drawing comprises a frame 1 supporting the elongated tank or sink 2 having a transverse partition 3 therein, dividing the tank or sink into a washing compartment 4 and a rinsing compartment 5. The structure is of such height as to provide for convenience in use including the use of the washing compartment for the washing of pots and pans and other large articles as well as for the washing of dishes as will appear as the description proceeds.

On the outer end wall 6 I mount brackets 7 and 8, these brackets being provided with bearings 9 for the rockshaft 10. This rockshaft is provided with rocker arms 11 and 12 which are arranged quite closely adjacent the front and rear walls of the compartment.

The rocker arms are provided with upwardly facing open bearings 13 adapted to removably receive the journals 14 of the basket cradle designated generally by the numeral 15. This basket cradle comprises corner uprights 16, 17 and 18, 18, connected by bottom bars 19 which constitute a frame-like base portion. The uprights 16 and 17 are diagonally opposed. The upper ends of the uprights 16 and 18 are turned outwardly at 20 to facilitate the placing of the dish basket 21 within the cradle. The dishes are indicated at 22. The basket has handles 23 so that the loaded basket can be easily manipulated in placing within and removing from the cradle.

To maintain the cradle in upright position, I provide a link 24 which is pivoted at 25 on the bracket 8, this link having a slot 26 in the end thereof adapted to releasably engage the pin 27 on the rear cradle upright 17. The link when so engaged is in parallel relation to the rocker arms so that the cradle is supported in upright position and oscillating movement permitted.

In the embodiment illustrated, the crank 28 is driven from the motor 29, the crank being connected by the connecting rod 30 to the rocker arm 12 which extends beyond its bearing 13 as best shown in Fig. 2.

With this arrangement, the rocker arms are given an up and down oscillating movement and this is imparted to the cradle and the basket carried thereby, effectively dashing the water across the dishes and very effectively washing the same.

The rinsing tank is provided with a stand 31 on which the basket may be positioned so that the dishes are supported to permit their being rinsed by manual manipulation of the spray head 32 which is mounted on the pipe 33, a flexible joint or coupling being provided at 34 for the arm 35 carrying the spray head. A valve 36 controls the rinsing spray. After rinsing, the basket may be placed upon the drain-board 37.

In the embodiment illustrated, a heating burner 38 is provided for the washing compartment. A drain pipe 39 is provided with a valve 40, the drain pipe 41 of the rinsing compartment being provided with a valve 42, while the washing compartment is provided with a valve 43. When the link 24 is swung to the retracted position shown in Fig. 2 and the basket and supporting cradle removed, the washing compartment is substantially unobstructed permitting, as stated, the washing of pots and pans and larger utensils.

My improved dish washing apparatus is quite economical in structure and at the same time is highly efficient.

The faucet 44 is swivelly mounted so that it may discharge into either compartment, hot and cold water valves 45 and 46 being provided for regulating the temperature of the water discharged. The burner is desirable for maintaining temperature in the washing compartment although the structure is very practical without this burner.

I have not attempted to illustrate structural modifications and adaptations that might be desirable for different installations. In the structure illustrated, the frame and tank of the receptacle are quite simple and of course it might be more elaborated should that be desired. It is believed the disclosure made will enable those skilled in the art to embody or adapt my invention as may be desired.

Having thus described my invention, what I claim as new and desire to secure by Letters Patent, is:

1. In a dish washing apparatus, the combination of a rectangular washing compartment, brackets mounted in laterally spaced relation on an end wall of said compartment, a rockshaft mounted on said brackets and provided with laterally spaced rocker arms disposed adjacent the side walls of the compartment and having aligned upwardly facing open bearings, a cradle comprising a frame-like base portion and corner uprights, diagonally opposed uprights being provided with supporting journals removably engageable with said bearings on said rocker arms, the rear upright having a pin vertically spaced from its journal, a link pivoted on the bracket adjacent the rear side wall and detachably engageable with said pin on said upright and being when so engaged in parallel relation to the adjacent rocker arm and positively retaining the cradle in an upright position, a driving crank above said compartment, a connecting rod for said crank to the rear rocker arm whereby an oscillating movement is imparted to said cradle, and a dish basket adapted to be removably supported in said cradle, said link being adapted to be swung to upright retracted position to permit the removal of the cradle from said compartment, whereby said compartment substantially unobstructed may be used for washing articles such as pots and pans.

2. In a dish washing apparatus, the combination of a rectangular washing compartment, brackets mounted in laterally spaced relation on an end wall of said compartment, a rockshaft mounted on said brackets and provided with laterally spaced rocker arms disposed adjacent the side walls of the compartment and having aligned upwardly facing open bearings, a cradle having front and rear uprights provided with supporting journals removably engageable with said bearings on said rocker arms, the rear upright having a pin vertically spaced from its journal, a link pivoted on the bracket adjacent the rear side wall and detachably engageable with said pin and being when so engaged in parallel relation to the adjacent rocker arm and positively retaining the cradle in an upright position, means for oscillating said rocker arms, and a dish basket adapted to be removably supported in said cradle, said link being adapted to be swung to upright retracted position to permit the removal of the cradle from said compartment, whereby said compartment substantially unobstructed may be used for washing articles such as pots and pans.

3. In a dish washing apparatus, the combination of a rectangular washing compartment, brackets mounted in laterally spaced relation on an end wall of said compartment, a rockshaft mounted on said brackets and spaced rocker arms on said shaft provided with aligned upwardly facing open bearings, a cradle comprising a frame-like base portion and corner uprights, diagonally opposed uprights being provided with supporting journals removably engageable with said bearings on said rocker arms, the rear upright having a pin vertically spaced from its journal, a link pivoted on the bracket adjacent the rear side wall and detachably engageable with said pin on said upright and being when so engaged in parallel relation to the adjacent rocker arm and positively retaining the cradle in an upright position, the axis of the pivotal connection of the link to the bracket being substantially parallel to the pivotal axis of the rockshaft to facilitate retention of the cradle in said upright position, a driving crank above said compartment, a connecting rod for said crank to the rear rocker arm whereby an oscillating movement is imparted to said cradle, and a dish basket adapted to be removably supported in said cradle.

4. In a dish washing apparatus, the combination of a rectangular washing compartment, brackets mounted in laterally spaced relation on an end wall of said compartment, a rockshaft mounted on said brackets and spaced rocker arms on said shaft provided with aligned upwardly facing open bearings, a cradle having front and rear uprights provided with supporting journals removably engageable with said bearings on said rocker arms, the rear upright having a pin vertically spaced from its journal, a link pivoted on the bracket adjacent the rear side wall and detachably engageable with said cradle and being when so engaged in parallel relation to the adjacent rocker arm and positively retaining the cradle in an upright position, the axis of the pivotal connection of the link to the bracket being substantially parallel to the pivotal axis of the rockshaft to facilitate retention of the cradle in said upright position, means for oscillating said rocker arms, and a dish basket adapted to be removably supported in said cradle.

5. In a dish washing apparatus, the combination of a receptacle, a rockshaft mounted within said receptacle and provided with laterally spaced rocker arms disposed adjacent the walls of the receptacle and having upwardly facing open bearings, a cradle provided with supporting journals removably engageable with said bearings on said rocker arms, a link disposed in substantial parallelism to said rocker arms and having one end pivoted in spaced vertical relation to said rockshaft and having its opposite end pivotally and detachably engageable with said cradle and positively retaining said cradle in upright position with its journals engaged in said bearings, the axis of the first named pivotal connection of the link being substantially parallel to the pivotal axis of said rockshaft, and the radius of oscillation of the outer end of the link at its point of pivotal connection to the cradle being substantially equal to the radius of oscillation of the outer ends of said rocker arms at their points of connection to the upwardly facing open bearings for supporting the cradle, to facilitate retention of the cradle in said upright position, a driving crank, a connecting rod for said crank to one of said rocker arms whereby an oscillating movement is imparted to said cradle, and a dish basket adapted to be removably supported in said cradle, said link when retracted being positioned to permit the removal of the cradle from said receptacle whereby said receptacle substantially unobstructed may be used for washing articles such as pots and pans.

6. In a dish washing apparatus, the combination of a receptacle, a rockshaft mounted within said receptacle and at a substantial distance below the top thereof and provided with laterally spaced substantially horizontal rocker arms disposed adjacent opposite side walls of the receptacle, a cradle disposed between and projecting above said rocker arms and pivotally supported by said rocker arms, a driving crank disposed above the receptacle, and a vertical connecting rod pivoted at its upper end to said crank and at its lower end to one of said rocker arms whereby an oscillating movement is imparted to said cradle.

7. In a dish washing apparatus, the combination of a receptacle, a rockshaft mounted within said receptacle and provided with laterally spaced rocker arms, a cradle removably engageable with said rocker arms, said cradle being adapted to removably receive a dish basket, a link disposed in substantial parallelism to said rocker arms and having one end pivoted in spaced vertical relation to said rockshaft and having its opposite end pivotally and detachably engageable with said cradle and positively retaining said cradle in upright position on said rocker arms, the axis of the first named pivotal connection of the link being substantially parallel to the pivotal axis of the rockshaft, and the radius of oscillation of the outer end of the link at its point of pivotal connection to the cradle being substantially equal to the radius of oscillation of the outer ends of the rocker arms at their points of connection to the cradle, to facilitate retention of the cradle in said upright position, and means for oscillating said rocker arms whereby an oscillating movement is imparted to said cradle and the dish basket carried thereby.

8. In a dish washing apparatus, the combination of a receptacle, a rockshaft mounted within said receptacle and provided with laterally spaced rocker arms disposed adjacent the walls of the receptacle and having upwardly facing open bearings, a cradle provided with supporting journals removably engageable with said bearings on said rocker arms, said cradle being adapted to removably receive a dish basket, means for positively retaining said cradle in an upright position, said means including a link disposed in substantial parallelism to said rocker arms, and pivoted at one end to said receptacle and at its opposite end pivotally and detachably engageable with said cradle with its journals engaged in said bearings, the axis of oscillation of the link to the receptacle being substantially parallel to the pivotal axis of the rockshaft, and the radius of oscillation of the outer end of said link at its point of pivotal connection to the cradle being substantially equal to the radius of oscillation of the outer ends of said rocker arms at their points of connection to said upwardly facing open bearing for supporting the cradle, to facilitate retention of the cradle in said upright position, and means for oscillating said rocker arms, said rockshaft, rocker arms and link being positioned so that when the link is disengaged from the cradle, and the cradle and basket removed from the receptacle, the receptacle is substantially unobstructed permitting the use thereof for washing articles such as pots and pans.

9. In a dish washing apparatus, the combination of a receptacle, laterally spaced substantially horizontally disposed rocker arms disposed within and at a substantial distance below the top of the receptacle, means for oscillating said rocker arms in unison, a dish supporting cradle disposed within said receptacle and pivotally supported on said rocker arms, a link disposed substantially parallel to said rocker arms, stationary means to which one end of said link is pivoted, said link at its opposite end being pivoted to said cradle to positively retain the cradle in an upright position, a driving crank disposed above said receptacle, and a connecting rod pivoted at its upper end to said crank and at its lower end to one of said rocker arms, the axis of the pivotal connection of the link to said stationary means being substantially parallel to the axis of oscillation of a rocker arm, and the radius of oscillation of the outer end of the link at its point of pivotal connection to the cradle being substantially equal to the radius of oscillation of the outer end of said rocker arm at its point of pivotal connection to the cradle, to facilitate retention of the cradle in said upright position.

JAMES C. STATE.

REFERENCES CITED

The following references are of record in the file of this patent:

UNITED STATES PATENTS

| Number | Name | Date |
|---|---|---|
| 501,347 | Insinger | July 11, 1893 |
| 574,606 | Heideman | Jan. 5, 1897 |
| 605,929 | Smead | June 21, 1898 |
| 661,514 | Gaillard | Nov. 13, 1900 |
| 719,936 | Colbath | Feb. 3, 1903 |
| 805,118 | Chamberlain | Nov. 21, 1905 |
| 814,329 | Sigler et al. | Mar. 6, 1906 |
| 902,064 | Fetherolf | Oct. 27, 1913 |
| 1,082,259 | Baumiller et al. | Dec. 23, 1913 |
| 1,161,916 | Barley | Nov. 30, 1915 |
| 1,400,388 | Stukey | Dec. 13, 1921 |
| 1,657,310 | Maggio | Jan. 24, 1928 |
| 2,167,185 | Preston | July 25, 1939 |

FOREIGN PATENTS

| Number | Country | Date |
|---|---|---|
| 652,741 | France | Oct. 29, 1928 |